United States Patent
Müntener

[19]

[11] Patent Number: 5,823,673
[45] Date of Patent: Oct. 20, 1998

[54] APPARATUS FOR PROCESSING DISPERSIONS OF SOLIDS IN A FATTY PHASE

[75] Inventor: Kurt Müntener, Bad Salzuflen, Germany

[73] Assignee: Richard Frisse GmbH, Bad Salzuflen, Germany

[21] Appl. No.: 517,453

[22] Filed: Aug. 18, 1995

[30] Foreign Application Priority Data

Sep. 16, 1994 [DE] Germany ............................ 44 33 039.1

[51] Int. Cl.⁶ ...................................................... B01F 7/16
[52] U.S. Cl. .......................... 366/303; 366/149; 366/286; 366/294; 366/295; 366/296; 366/305; 366/313; 366/314
[58] Field of Search ............................. 366/64–67, 96–98, 366/139, 149, 194–196, 286, 292–296, 302, 303, 305, 307, 309, 312, 314, 313

[56] References Cited

U.S. PATENT DOCUMENTS

| | | | |
|---|---|---|---|
| 1,483,742 | 2/1924 | Nicol | 366/303 X |
| 2,278,051 | 3/1942 | Ambrose | 366/303 X |
| 2,793,847 | 5/1957 | Steele | 366/295 X |
| 2,876,082 | 3/1959 | Morrison | 366/296 X |
| 4,723,849 | 2/1988 | Boring | 366/303 X |
| 5,353,696 | 10/1994 | Stadelmann et al. | 366/139 X |
| 5,505,537 | 4/1996 | Previero | 366/314 X |

FOREIGN PATENT DOCUMENTS

| | | | |
|---|---|---|---|
| 0279255 | 8/1988 | European Pat. Off. . | |
| 1226406 | 10/1966 | Germany . | |
| 1227767 | 10/1966 | Germany . | |
| 1368182 | 1/1988 | U.S.S.R. | 366/292 |
| 1604446 | 11/1990 | U.S.S.R. | 366/305 |

OTHER PUBLICATIONS

Lueger "Lexikon der Technik" (Dictionary of Technology), Rowohlt Taschenbuch Verlag, 1972, p. 704.

*Primary Examiner*—Charles E. Cooley
*Attorney, Agent, or Firm*—Martin A. Farber

[57] ABSTRACT

An apparatus for processing dispersions of solids in a fatty phase has at least two parts (1, 4) which can be driven with the aid of at least one drive and caused to rotate relative to one another, form a processing gap (6, g1, g2, g1', g2') between one another and are mounted relative to one another by means of at least one rotary bearing (2 or 3). One part is in the form of processing container (1) having at least one feed orifice (9) and at least one outflow orifice (11). The other part (4) is arranged essentially concentrically with the first part (1) and with the axis of rotation (A). At least one of the two parts (1 or 4) is provided with shearing tools (7, 8) on the surfaces (12, 16) facing one another. The processing container (1) is essentially conical, the cone having its smaller end face on the side of the feed orifice (9).

12 Claims, 5 Drawing Sheets

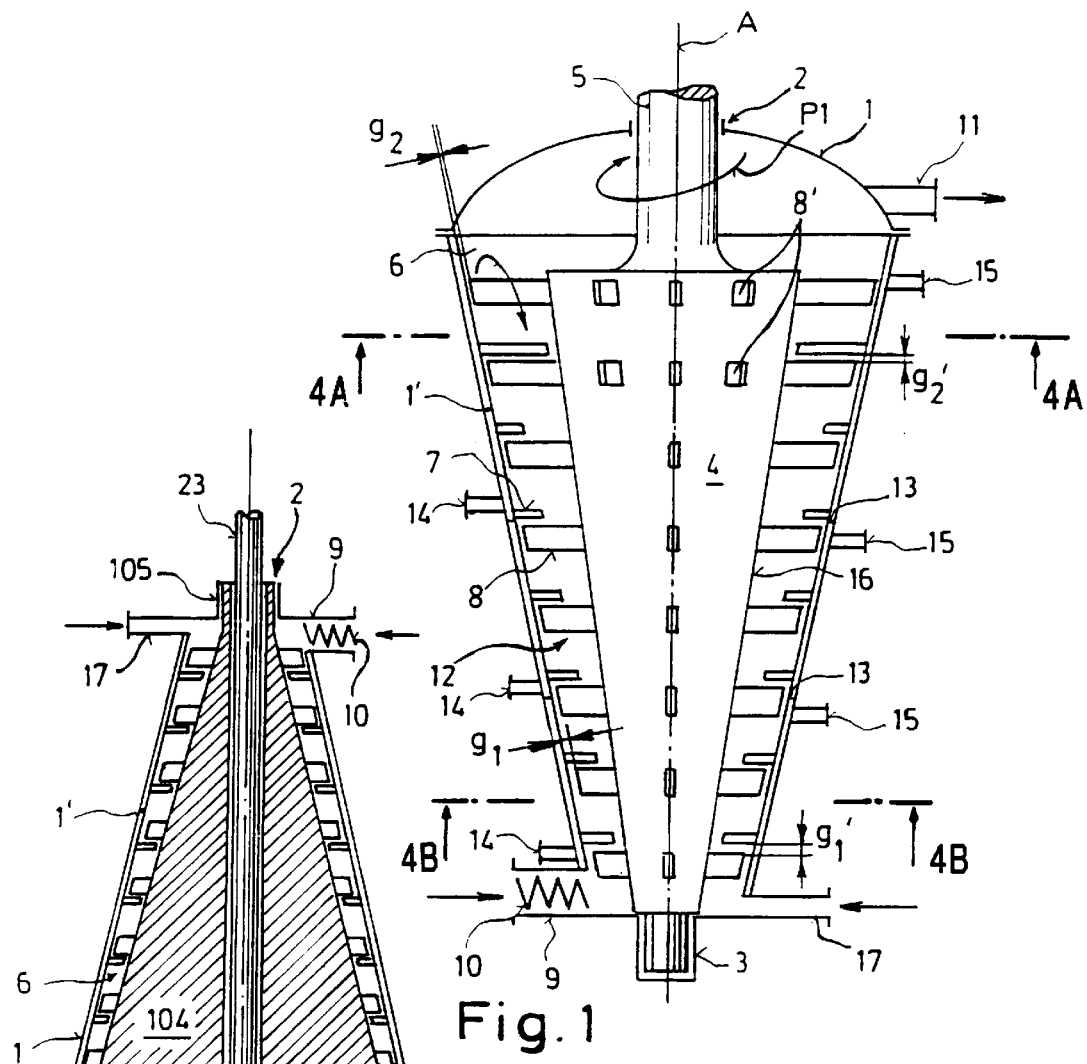
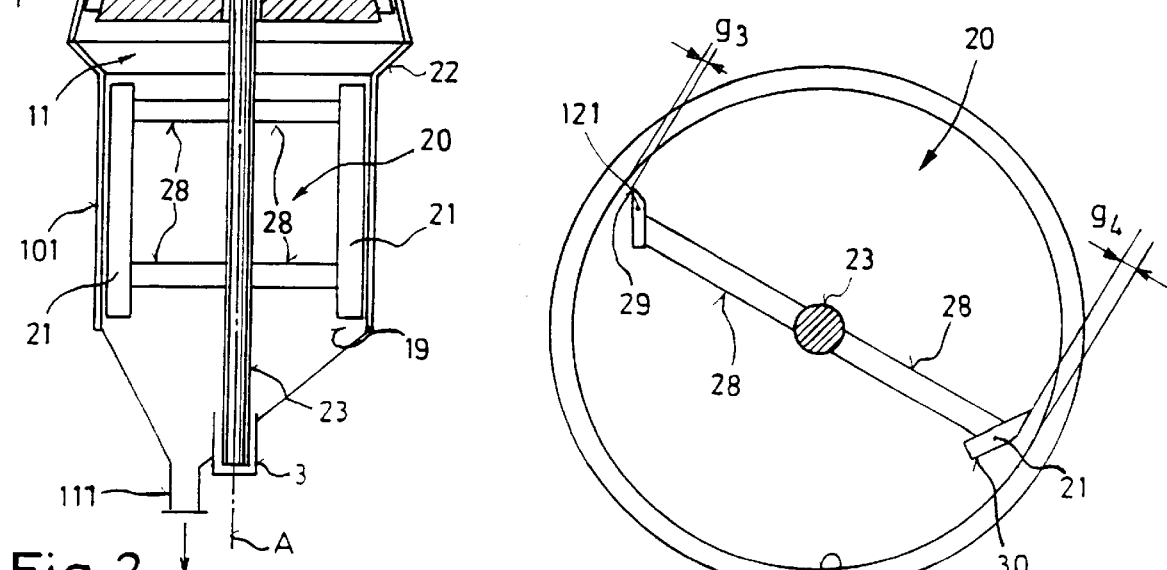
Fig. 1
Fig. 2
Fig. 5

APPARATUS FOR PROCESSING DISPERSIONS OF SOLIDS IN A FATTY PHASE

FIELD AND BACKGROUND OF THE INVENTION

The invention relates to an apparatus for processing dispersions of solids in a fatty phase.

Such an apparatus has been disclosed, for example, in EP-A-279255 and is used for reducing the viscosity of chocolate materials by means of shear forces between the two parts rotatable relative to one another, the outer of which usually being a stator forming a container, and the inner of which being the rotor exerting the shear forces. However, as is known in the case of other apparatuses acting with shear force, such as, for example, in the case of stirred ball mills, the function of the two parts can also be interchanged, the outer part being rotated and the inner part being stationary, or both parts can be driven and caused to rotate. Usually, both parts have shearing tools on the inner surfaces facing one another, which tools form shear gaps on the one hand between their radial end and the opposite circumferential wall and on the other hand also between one another.

SUMMARY OF THE INVENTION

If the object is to reduce the viscosity of chocolate, it is necessary to rely on the knowledge available to a person skilled in the art, according to which, in the course of liquefaction from a dry state, the chocolate is converted into a doughy, pasty state before it then finally reaches a liquid state. Depending on these different states, the energy consumption per time unit for processing such a material (and this applies in a similar manner to all materials containing solids in a fatty phase) differs very greatly, namely generally decreases.

In a first conceptual step, the invention is based on the following knowledge: if chocolate were actually to be allowed to pass through the known apparatus, the maximum power consumption would occur in the region of the feed orifice, whereas the chocolate would have become less viscous towards the outflow side and it would therefore be necessary to consume less power through shearing. This means nonuniform loading of the apparatus on the one hand and, on the other hand, that the efficiency of the apparatus decreases towards the outflow.

If the invention then examines the cause of this property of the apparatus in a further conceptual step, it is found that this phenomenon is primarily due to the cylindrical design of the two parts which are rotated relative to one another and whose uniform diameter permits only a uniform processing speed (with decreasing viscosity). This is because the shear stress $\tau$ is obtained from the relationship $\tau = D \cdot eta$, where D is the shear velocity (velocity of the moving surface divided by the gap width) and eta is the viscosity of the material.

In a further conceptual step, the invention is based on the consideration that it must be possible to increase the shear velocity. However, since the shear effect occurs chiefly at the shearing tools, this is achieved, according to the invention, in that the processing container (1) is essentially conical, the cone having its smaller end face on the side of the feed orifice (9) conical arrangement of the processing means with smaller end on the side of the feed orifice.

When the term cone is used in this context, it must be remembered that, according to Lueger "Lexikon der Technik" [Dictionary of Technology], Rowohlt Taschenbuch Verlag, 1972, page 704, a cone can be bounded not only by straight generators, as is the case with a proper cone, but also by curved generators, in which case the term improper cone is used. This is important in the present case because a relationship deviating from a straight line arises per se from the above-mentioned mathematical relationship. However, it can be very well approximated with a straight line, so that the cone may also readily be a "proper cone".

Increasing the diameter of the processing container towards the outflow results, in the shear gap between the particular shearing tool and the radially opposite circumferential wall on the one hand and axially between the intermeshing shearing tools on the other hand, in a higher velocity which leads to an increase in the shear velocity and hence to at least partial compensation of the shear stress caused by the reduction in the viscosity.

Although under these conditions the inner of the two parts may be formed in any desired manner, for example it may also be cylindrical, another formation is preferred, wherein the increase in the volume due to a conical widening of the processing container is at least partly compensated, so that the residence time of the material in the individual zones is evened out over the axial length of the apparatus.

The fact that, according to the invention, the processing container is conical and widens in the direction of flow of the dispersion also focuses attention on the arrangement of the shearing tools from new points of view. On the one hand, particularly in the case of a conical shape of the second, inner part, this will give rise to additional surfaces on which such shearing tools can be mounted; on the other hand, it is in fact intended to increase the shear effect towards the outflow.

Further details and features of the invention, in particular for supporting the Claims, are evident from the following description of embodiments shown schematically in the drawings.

BRIEF DESCRIPTION OF THE DRAWINGS

FIG. 1 shows a first embodiment according to the invention, in a simplified axial section;

FIG. 2 shows an alternative embodiment;

FIG. 5 shows a cross-section through a conche container having tools formed according to the invention;

DETAILED DESCRIPTION OF THE EMBODIMENTS

Figure 3:
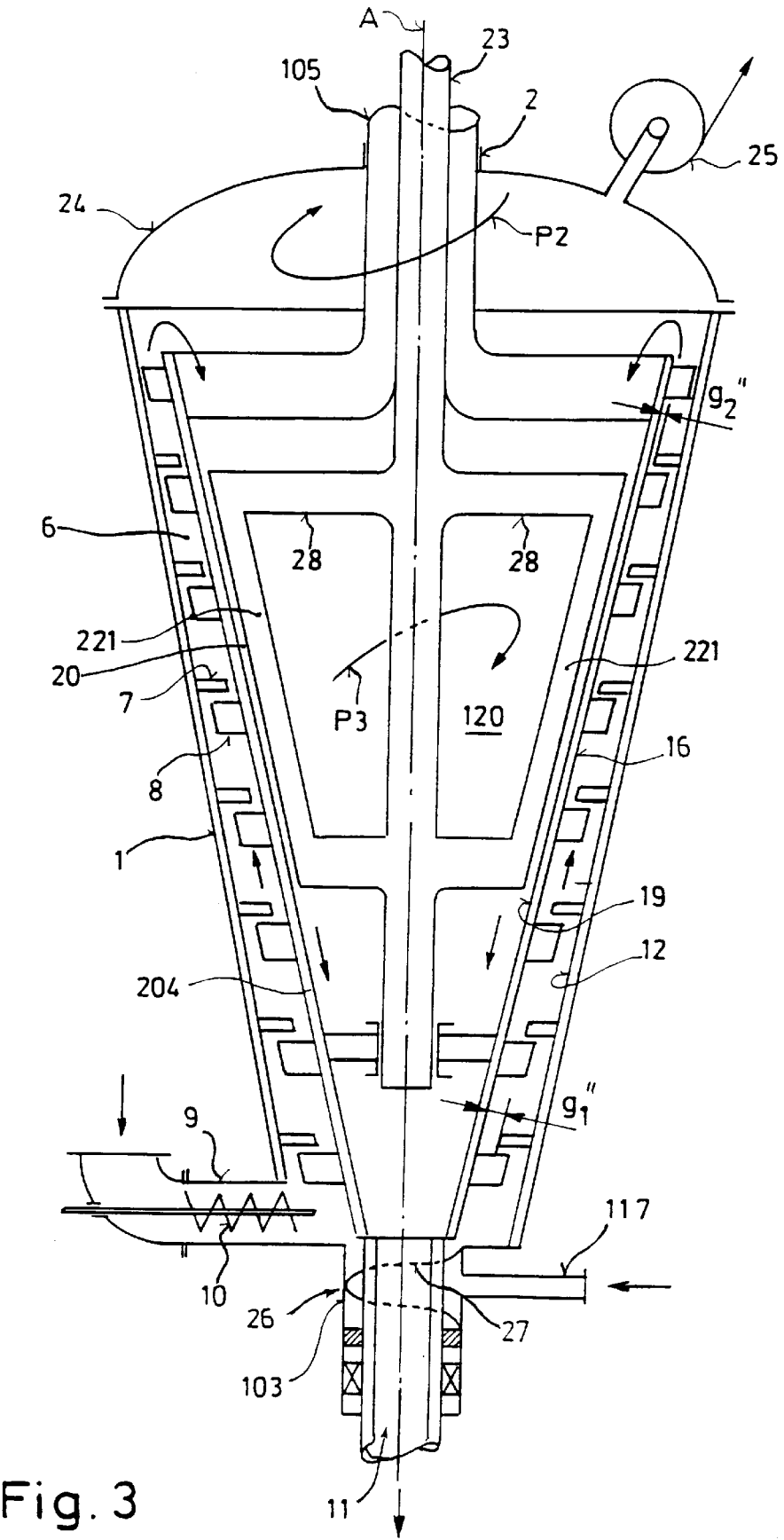
FIG. 3 shows a particularly preferred embodiment.

According to FIG. 1, a processing container 1 forming a first, outer part of the apparatus and a rotor part 4 mounted therein concentrically on schematically indicated bearings 2, 3 and having a shaft 5 are provided. However, it may also be desirable to mount the rotor 4 only at one end. The rotor 4 can be driven and caused to rotate relative to the container 1 in the direction indicated by the arrow P1 by a drive means which is not shown and the shaft 5. From the following description, however, it is evident that this rotation need be only a relative rotation, i.e. at least a part of the container 1 could rotate relative to a stationary (or likewise driven) second, inner part 4, as has already been proposed for stirred ball mills.

As indicated by the double boundary lines of the container 1, the latter can be designed with an outer jacket for forming an intermediate space 1' to enable the container 1 to be heated or cooled, depending on the requirements. This intermediate space 1' may be subdivided in a manner known per se, either by being subdivided into helical thermostating channels by at least one intermediate wall drawn through in a helical manner, and thus ensuring forced transport of the coolant (generally water), or by being subdivided into several zones in succession by partitions 13 transverse to the axis, said zones being capable of being thermostated at different temperatures. For example, the feed zone is heated in order more readily to liquefy the chocolate material, whereas the region on the outflow side, at the top of FIG. 1, receives the coolant, making it possible to intensify the shearing effect there. The middle region (two or more than three thermostated regions may also be provided) may convey a carrier medium with a temperature in between. Accordingly, each region is equipped with a separate inlet pipe 14 and an outlet pipe 15.

From the above explanation, it is evident that this subdivision too is a measure for evening out the shearing effect in the direction of material flow (with decreasing viscosity of the dispersion), so that this measure is of inventive significance even independently of the conical shape of the milling container 1.

The two parts 1, 4 bound between them a processing gap 6. At least one of the two parts 1, 4, but preferably both parts, has or have shearing tools 7, 8 in this gap for processing a fat dispersion flowing through, such as chocolate. The shearing tools may have a shape which is known in the relevant technology, for example may be pin-like, knife-like or, in order to promote material flow, paddle-like with a more or less inclined position. Furthermore, the number of tools may differ over the relevant circumference of the parts. It has already been stated that the viscosity of the dispersion will decrease in the direction of flow of material through the apparatus, which in fact is also the purpose of this apparatus. Thus, the rotor 4 has, in its upper two rings of shearing tools, for example, eight such shearing tools 8' distributed over the circumference (three of which are behind the rotor 4 and are therefore not visible), whereas it has only tool rings with four shearing tools 8 each at the lower end. These numbers are of course merely examples and can be modified as desired to meet the requirements. It is also evident that increasing the shearing tools towards the outflow would be expedient independently of the conical shape of the processing container and in itself therefore also constitutes an invention, although it is evident that the conical shape also affords particularly advantageous possibilities for this purpose. Moreover, it is evident that increasing the number of shearing tools towards the outflow 11 can be realized not only on the rotor 4 but alternatively or cumulatively also on the container 1 (and is preferably realized thereon).

When the term material flow is used in this context, this takes place from an inlet connection 9, which can expediently be provided with a force transport means, such as a pump or (as indicated here) with a screw 10, to an outflow connection 11 at the top of the container 1. The screw 10 and the connection 9 forming the screw housing may be mounted and formed in a manner known per se, for example as has been disclosed for stirred ball mills in DE-B-1 226 406 or 1 227 767, so that a detailed illustration and description can be dispensed with. It is sufficient to state that as a result the dispersion to be processed is introduced under pressure into the container 1 and therefore flows through the shearing gap 6 towards the outflow 11. However, it is evident that this is only one example of a thermostating means which can also be formed in another known per se manner, for example by means of heating zones having electrical surface heating or cooling zones having a volatile, heat-absorbing coolant, provided only that the subdivision described above into at least two zones is carried out.

A further measure for intensifying the shearing effect in the direction of the material flow is to make the radial gap g1 or g2 between the radially outer edges of the shearing tools 8 of the rotor 4 and of the inner surface 12 of the container 1 narrower in the direction of the material flow, i.e. g2 <g1. Although the same applies for the shearing tools 7 of the container 1 (the stator tools) relative to that outer surface 16 of the rotor 4 which is radially opposite them, the rotational speed will of course be greater on the radial outer side owing to the conical shape of the container 1, with the result that the main part of the shearing effect is applied there in particular when (as shown in the upper part of FIG. 1) the shearing tools 8 are relatively long. The fact that the shearing work is therefore performed predominantly radially on the outside makes it possible to make the stator tools 7 relatively short, in the manner shown in FIG. 1, although it would also be possible to tailor their length towards the outer surface 16 of the rotor 4 in such a way that a relatively narrow shearing gap is formed there too, which can then become smaller towards the outflow 11 in a manner similar to the gaps g1 and g2.

As is evident from the above explanation, the shearing effect therefore takes place predominantly on the radially outer side, and it is there in fact that the stator tools 7 interacting with the rotor tools 8 are also provided. The latter together therefore form first axial shearing gaps g1' to g2', and here too the processing can be intensified towards the outflow 11 by reducing the axial gap width, i.e. g1'>g2'. Of course, the dimensioning, according to the invention, of the gap width is also a measure which leads to the desired intensification of the shearing effect in the direction of the material flow, even without the conical shape of the container 1, and is therefore of independent inventive significance.

In the apparatus shown in FIG. 1, the conicity of the container 1 is more pronounced than that of the rotor 4, i.e. the setting angle of the surface 12 of the container 1 relative to the longitudinal axis A is greater than that of the surface 16 to the axis A. In other words, the circumferential wall 16 approaches the inner circumferential wall 12 towards the feed and thus widens the intermediate processing gap between these walls 12, 16 towards the outflow 11. As a result of this—and owing to the conicity of the container 1—the gap volume in the individual successive axial regions of the apparatus increases. This results in increasing residence times of the dispersion towards the outflow 11, i.e. the further material flowing from below mixes with the material (still) present further above. In the case of some dispersions and formulations, this mixing effect is even desirable, the mixing effect being further improved by virtue of the fact that, in the upper axial regions of the apparatus, the chocolate will become more fluid and can therefore be more readily mixed.

However, since the chief purpose of the apparatus according to the invention lies in the shearing effect, and this effect would be achieved to different extents by different residence times, it is also preferable if the gap 6 between the surfaces 12 and 16 becomes narrower towards the outflow 11. In order to completely even out the volumes in the individual axial sections, the gap 6 can be constricted in a corresponding manner so that the volume in the region of the shearing tools 8' is equal to that in a lower section in the region of two shearing rings 8. However, in order to intensify the processing, it may be desirable to reduce the gap 6 in an upward direction to an even greater extent so that the volume in the region of each ring 7, 8' is even smaller than in the region of each ring 7, 8. In any case, a constriction, based on the illustrated longitudinal section through the apparatus, of the gap 6 is preferred at least for keeping the partial volumes in the individual axial zones constant.

It should be mentioned that, although a single feed 9 is shown, several feeds—distributed over the circumference and/or distributed in the axial direction—should however be provided for the purposes of the present invention. Such a further feed may serve as an inlet for introducing a treatment material into the conical treatment container 1. Such an inlet 17 is shown at the bottom of the container 1 and can be provided for the introduction of air, sugar solution, cocoa butter or other ingredients. From the above explanation, it is however clear that several such inlets can be arranged at several points.

An embodiment having a gap 6 narrowing towards the outflow 11 is shown in FIG. 2, in which parts having the same function possess the same reference numbers as in FIG. 1, but parts having a similar function have the same reference numbers but with an additional hundreds digit.

In this embodiment, the feed 9 is at the top whereas the outflow 111 is provided at the bottom. In between is the outflow 11 of the actual liquefaction container 1, which outflow leads into a further processing container 101 underneath. In this lower container, conche treatment is carried out with the aid of shearing and/or ointment-producing tools 21 which interact with the inner surface 19 of the container 101 in a manner known per se for conche treatment. Since the shearing tools generally provided for the dry conche treatment are dispensable in the arrangement shown, comprising the liquefier 1, 104 upstream of the container 101 (the shearing work is in fact already performed in the container 1), the conche 101 can be equipped exclusively with the shearing or ointment-producing tools 21 (the difference with respect to scraping or scratching tools will be discussed below with reference to FIG. 5), which leads to a simplification of the conche treatment—and as has been found—even to a shortening of the conche treatment process. Thus, connecting a liquefier, as described above, in series with a subsequent conche treatment space 20 is particularly advantageous, regardless of the design of the container 1, so that this series connection also constitutes a separate invention.

This also applies to the possible case where the conche treatment space 20 is upstream of the liquefier, in which case, however, the mode of operation changes slightly. In this case, the chocolate would in fact either have to be pretreated or would have to enter the conche space in dry form in order to be converted into a pasty state, after which liquefaction would be effected in the container 1. The embodiment according to the subsequently discussed FIG. 5 is particularly suitable precisely for such a case, even though the embodiment discussed there is of particular interest very generally for conches.

However, since the above explanations show that the container 1 is equipped and suitable very particularly for the shearing work, it is preferable to allow it to perform the shearing work from the beginning and to arrange the conche space 20 downstream in the manner shown.

The admission of air is not unimportant with regard to the conche treatment, and it is also for this reason that at least one air inlet 17 is provided here. However, it is advisable to supply fresh air in particular to the conche space 20, which can be effected, for example, in the region of a container constriction 22. This container constriction 22 has oblique surfaces which collect the material emerging from the shearing gap 6 and distribute it uniformly over the walls of the conche container 101 underneath.

Since the apparatus is now virtually in three parts, i.e. also has the conche rotor with a shaft 23 and the ointment-producing tools 21 projecting radially therefrom, in addition to the processing container 1 or 101 and the rotor 104, it is necessary to provide separate drive means for the rotors 104 and 21, 23. This means that the shaft 105 is now in the form of a hollow shaft and is driven either by a motor which is separate from the shaft 23 or by means of a gear. The rotor 104 itself then has a passage for the shaft 23 and may itself consist of, for example, tungsten carbide or ceramic material, such as silicone carbide or silicone nitride. Such a structure is advisable in particular because of the abrasiveness of cocoa-containing materials and the resulting shear stresses.

It is evident that the container combination 1, 101 can reach a relatively considerable length. A particularly advantageous and compact apparatus is now described with reference to FIG. 3. Once again, a conical processing container 1 having tools 7 is provided, in which a rotor 204 which can be driven by means of the shaft 105 and has shearing tools 8 is mounted coaxially on bearings 2, 103. The decreasing axial shearing gap g1" or g2" in the direction of the material flow from the feed 9 to the outflow 11 with deflection over the upper edge of the rotor 204 is shown here between the outer surface 16 of the rotor 204 and the inner ends of the stator tools 7. The stated deflection preferably takes place in the manner of an overflow, i.e. the preferred orientation of the axis A is—as shown—vertical, although a horizontal or oblique arrangement would also be possible.

However, in order to achieve the deflection mentioned, the rotor 204 is in this case in the form of a hollow rotor, so that its inner wall surface simultaneously forms that bounding surface of a refinement space 120 which interacts with tools 221 of a further rotor 28 (221, 23, 28) including shaft 23 and arms. Thus, the volume of the rotor 204 is utilized for housing the space 120, and greater compactness is thus achieved. It is useful if the two parts driven by means of the shafts 105 and 23 have different rotational speeds so that they move relative to one another. However, different rotational speeds means not only the case of identical direction of rotation and different values of the speed but also (and in particular) rotation in opposite directions, as indicated by arrows P2 and P3 in FIG. 3. Thus, one speed has a positive sign and the other a negative one. The two speed values may, but need not, be equal (but in opposite directions).

Although it is preferable if the tools 221 are in the form of shearing and/or ointment-producing tools of a conche, as discussed below with reference to FIG. 5, it is also possible to form the space 120 together with the associated rotor 221, 23 in the manner of a thin-film evaporator. The tools or wipers of such a thin-film evaporator can be formed according to the relevant technology.

For a thin-film evaporator, the hollow shaft 105 could be formed with a rotary inlet (not shown) for a heating medium, and a corresponding cavity for this heating medium could be provided between the surfaces 16 and 19. In this case (but also in the case of a conche), it is particularly advantageous if the space 120 is connected to an extractor for any vapours.

For this purpose, a suction fan 25 may be connected to a cover 24 for the container 1. Furthermore, it is advantageous to provide, for example, the air inlet 17 discussed with reference to FIG. 1, but an even more expedient embodiment is chosen in the present example, as described below.

One problem with such doughy pasty materials is the sealing of the bearings to prevent them from becoming soiled. As already mentioned, cocoa-containing materials are in fact relatively abrasive, the problem of hygienic operation and of prevention of bacterial attack in addition being encounted. In order therefore to prevent material to be processed from coming into contact with the bearings, and in particular with the lower bearing 103, it is preferable to provide, in the region thereof, a repulsion means 26 which generates an opposite movement against any penetrating treatment material.

Such a repulsion means 26 can alternatively have a screw 27 which is connected to the rotor 204 or rigidly fastened to said rotor and whose screw threads are formed in such a way that they convey upwards during rotation of the rotor 204, i.e. in a direction opposite to the direction of penetration of treatment material. In addition or alternatively, the stated air supply to the space 120 may be effected via an inlet 117 which blows air under pressure through the neighbouring region of the bearing 103 and thus performs a dual function by supplying the air required for refinement on the one hand and blowing out any penetrating treatment material on the other hand. Accordingly, the pipe connection is connected to a compressed air source (not shown). If both the screw 27 and the inlet 117 are provided in the manner indicated, the screw 27 does not of course constitute an obstacle to blowing in of the air; rather, the air is guided in a helical manner along the threads of the screw and also prevents soiling of said screw.

It has already been mentioned above that the inlets 17 can also be used for feeding in other additives, such as, for example, a sugar solution, milk, etc. This also applies of course to the inlet 117, since all that is relevant is in fact to feed in cleaning fluid through the bearing region, it also being possible for the cleaning fluid to be suitable as a treatment medium. It is also clear that the bearing arrangement 103 shown, having the repulsion means 26, is not only advantageous in the embodiment according to FIG. 3 but can also be used in the other embodiments.

Of course, it would in principle be possible to reverse the arrangement, i.e. to provide the shearing tools 7 and a corresponding shearing rotor on the inner surface of the hollow rotor 204 and to carry out the refinement on the outside, but the available space is better utilized with the embodiment shown.

Figure 4A:
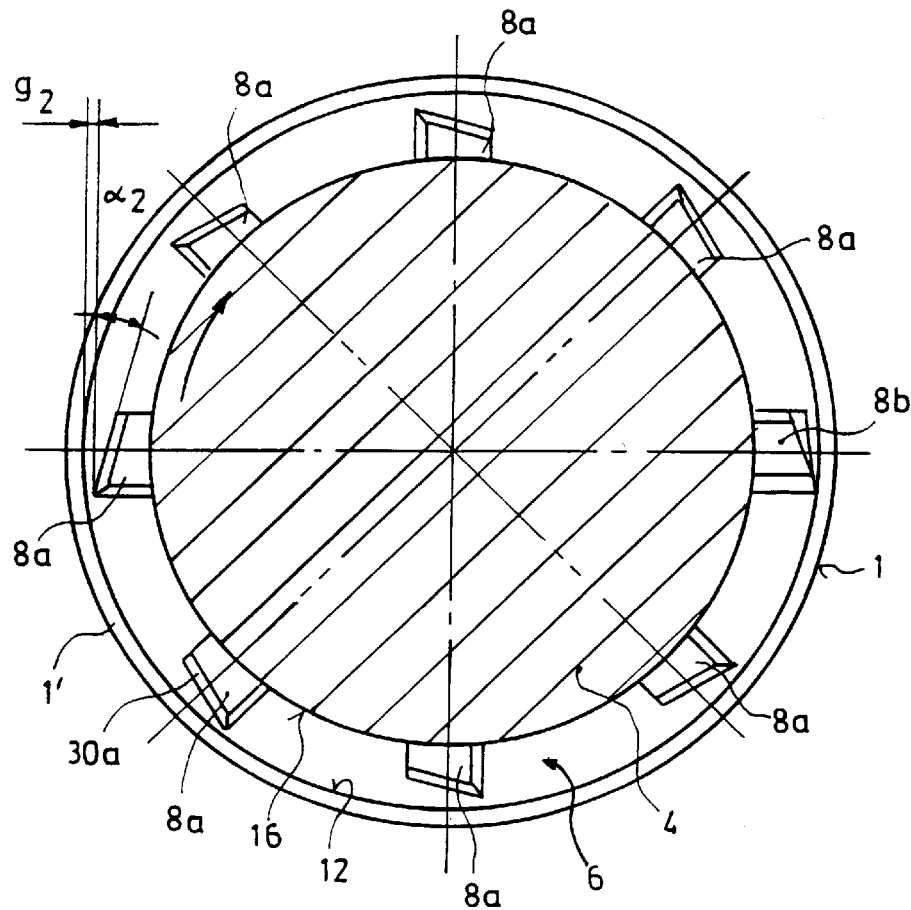
FIG. 4A and 4B show two sections along the lines 4A—4A and 4B—4B of FIG. 1, but with a slightly varied embodiment of the rotor and its tools.
Figure 4B:
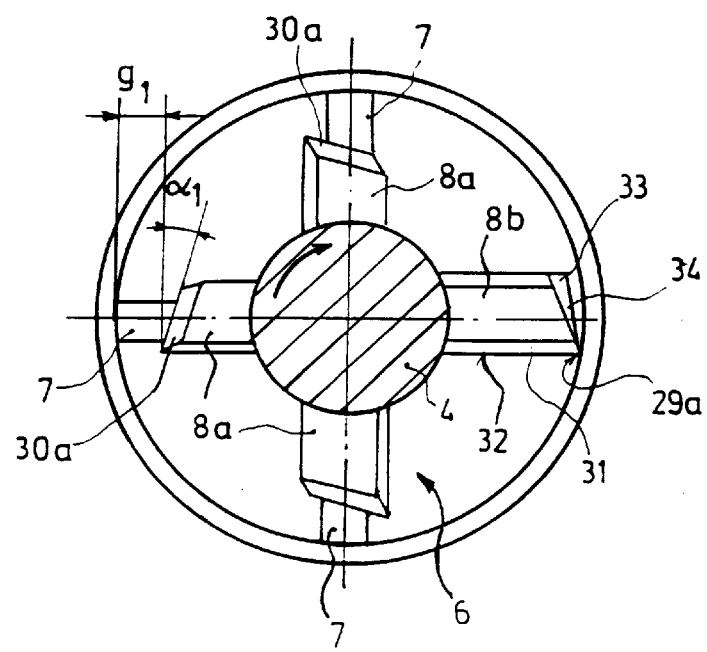

A particularly advantageous embodiment of the tools of the rotor 4 (and analogously of the rotor 104) is shown in FIG. 4A and 4B, which represent sections along the lines 4A—4A and 4B–4B, respectively, of FIG. 1. With reference to the functions of the tools of a conche, tools 8a having a shearing and ointment-producing effect and tools 8b having a shearing and scratching effect are provided. Of these, the scratching tools according to FIG. 4B have a shearing edge 29a which leads in the direction of rotation (cf. arrow) and which is formed by two bevels, namely a lateral ground surface 31 which leads to a forward-pointing shear edge 32, preferably symmetrical from two sides with respect to a central plane of the tool 8b (the rear edge is expediently formed in the same manner), and an end bevel 33 which results in a radially outer shear edge 34. To ensure that the shear edge 29a does not make only a thin cut through the material to be treated, it is advantageous if at least the tools 8b, optionally also the shearing tools 8a, are twisted in the form of a helix.

On the other hand, the tools 8a according to FIG. 4A have a surface 30a which diverges in the direction towards the container wall 12 and, if desired, might be broadened in the manner of a shoe. This ointment-producing surface 30a thus picks up the treatment material in front of it and forces it, with shearing of the individual Theological layers, into the increasingly narrowing gap g1 (FIG. 4B) or g2 (FIG. 4A). Here too, it is evident that g1>g2. In addition, however, it may also be advantageous to increase the shearing in the upper region of the container 1, which region is on the outflow side, so that the shearing and ointment-producing surfaces 30a at the top make a smaller angle α2 with the tangent to their path of revolution than in the lower region of the rotor 4, where a larger angle α1 is present.

Of course, such a measure also leads to the desired increase in the shearing effect in the known cylindrical containers and is therefore a measure as such which is independent of the conicity of the container 1 but is particularly effective together with it. Furthermore, it is clear that the number of scratching tools 8b may also be larger, but one such tool 8b per tool ring is advantageous.

The shearing and/or ointment-producing tools used for the conche treatment were referred to again and again above, and it is therefore now intended to discuss them in more detail with reference to FIG. 5. This FIG. 5 shows a cross-section through the shaft 23, either of the embodiment according to FIG. 2 and/or of that of FIG. 3. However, the arrangement according to FIG. 5 is preferably used when, for example, a conche having the form shown in FIG. 5 is connected upstream of an apparatus according to one of the previously discussed Figures, as has already been mentioned above as a possibility.

However, FIG. 5 also illustrates two essentially identical tools 21 and 121 on arms 28 projecting radially from the shaft 23, but the two tools point in opposite directions. This means that, when the shaft 23 rotates in the clockwise direction, the tool 121 sweeps along the surface 19 of the space 20 with a relatively sharp shearing or scratching edge, this scratching edge 29 being a relatively small distance g3 from the surface 19. The treatment material thus scraped from the trough wall 19 is exposed to the air in the space 20 during rotation of the tool 121 and then falls downwards, whereas treatment material which comes into contact in the trough with an ointment-producing surface 30 facing the surface 19 is pressed against the wall 19 in the gap g4 converging towards the trough wall 19 and is converted into ointment on said wall under shearing action between the individual rheological layers. The shearing tool 121 which next passes by then removes the treatment material again from the trough wall 19 and exposes it again to the air.

It is evident that this permits very intensive conche treatment, the smallest gap g4 between the ointment-producing surface 30 converging towards the trough wall 19 (relative to the direction of rotation of the shaft 23) expediently being larger than the gap g3. The difference may be about 2:1, for example an order of magnitude of 1 to 2 mm being possible for the gap g3 and an order of magnitude of 2 to 6 mm for the gap g4.

Of course, such an arrangement of scratching (121) and ointment-producing tools 21 alternating with one another or opposite one another is very generally particularly advantageous for conche treatment and is therefore not restricted to the use of an upstream or downstream liquefier or to its conical container. Furthermore, the invention is of course not restricted to containers having a vertical axis A but is also applicable to those having a horizontal axis A.

However, a vertical axis A is advisable wherever uniform distribution of the treatment material over the trough wall is important, as is expedient also in general in an embodiment according to FIG. 3.

Of course, a large number of modifications are possible within the scope of the invention; for example, it would be possible in the case of an embodiment according to FIG. 3 also to provide in the space 20 rings of shearing tools 7, 8 which are similar to those in the gap 6. However, this would mean that one of the above-mentioned measures for increasing the shearing towards the outflow 11 would have to be implemented, such as reducing the radially outer and/or the axial gap g1 or g2 and/or increasing the number of tools towards the outflow (which would be substantially more difficult owing to the decreasing conicity) and/or reducing the angle α shown in FIGS. 4. Although this possibility does in principle exist it is not preferred, owing to the possible design difficulties.

Figure 6:
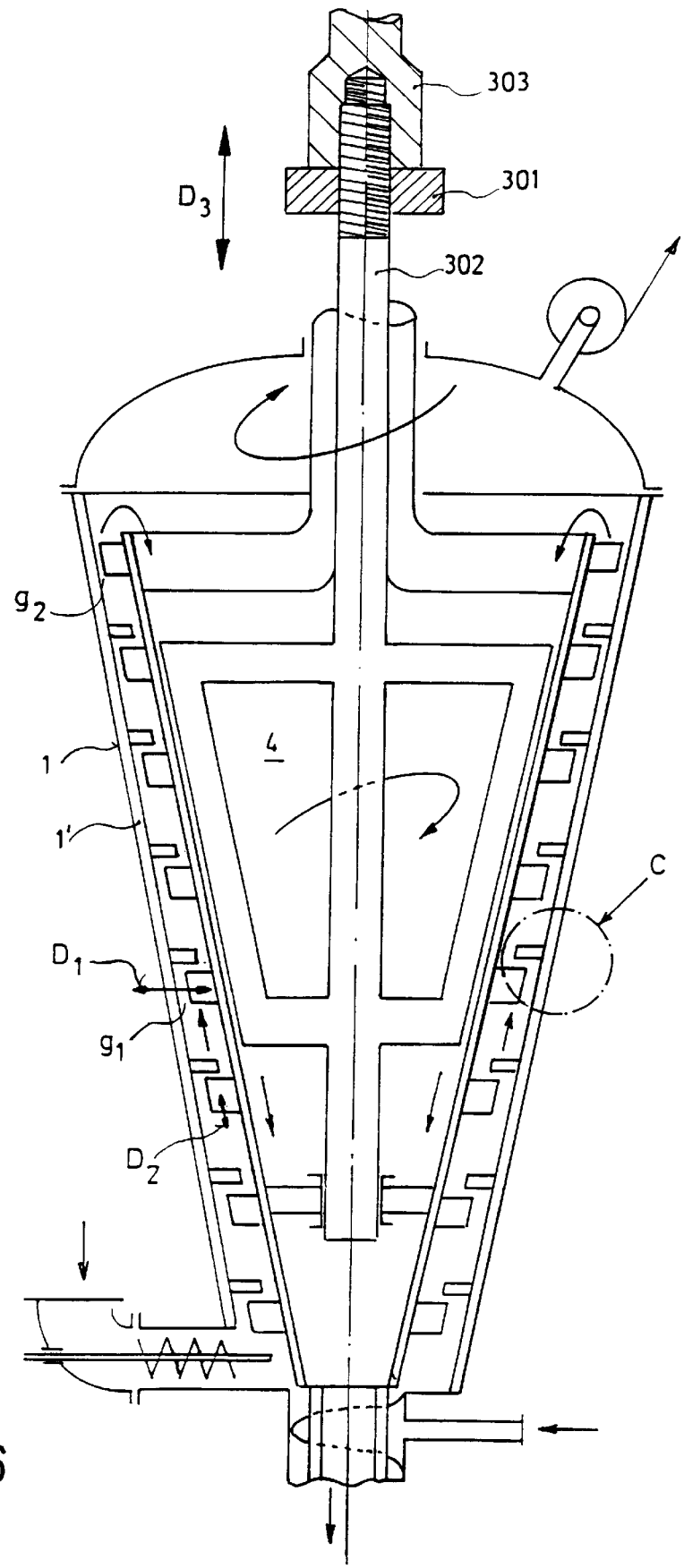
FIG. 6 shows a further embodiment of the invention.

FIG. 6 shows an apparatus for moving the rotor part 4 in direction $D_3$ of the axis of rotation. A thread 302 which is engaged by a coupling 303 provided with a suitable internal thread is provided at the driven end of the shaft. The distance g1 or g2 can be set by means of a lock nut 301, the distances being variable in the direction indicated by double arrows $D_1$ and $D_2$.

Figure 7:
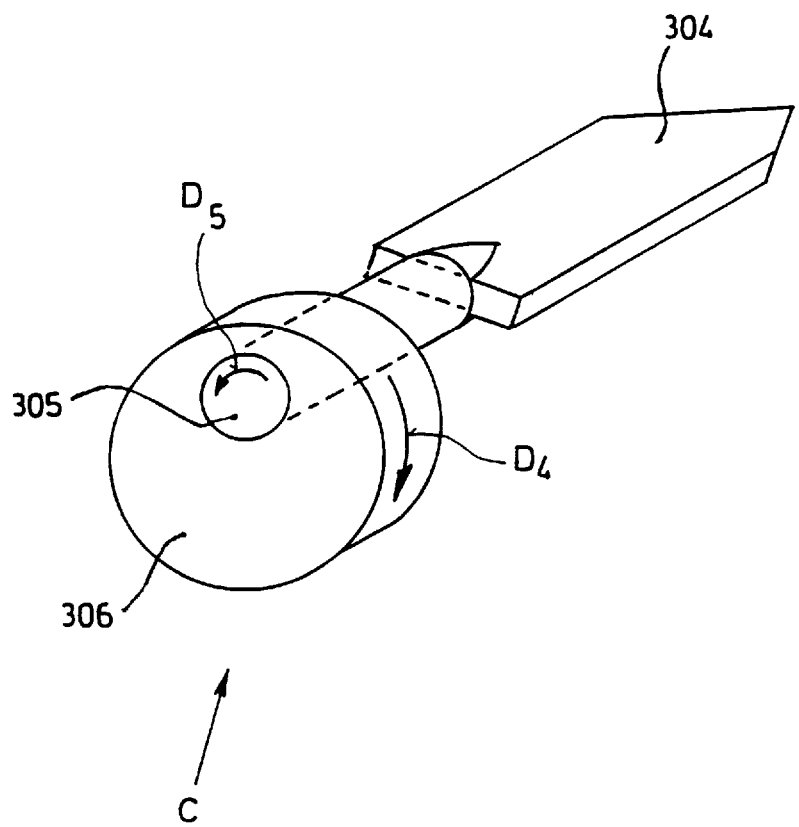
FIG. 7 shows the detail C from FIG. 6.

FIG. 7 shows the detail C of FIG. 6. The shearing tools 304 can be rotatably adjusted in order to change the distances g1' and g2' of FIG. 6. The shearing tools are rotatable on a cam 306 in the direction of rotation $D_5$ and can be fixed by means of a holder 305, the cam 306 itself being rotatable in direction of rotation $D_4$ and being capable of being fixed.

I claim:

1. An apparatus for processing dispersions of solids in a fatty phase, comprising:
   at least one drive means for imparting rotational movement;
   first processing means being formed as a processing container including at least one supply opening and at least one discharge opening, the processing container being of conical shape having an outer conical surface, an inner conical surface, and a smaller front plane of its conical shape located on a side of said supply opening, said supply opening and said discharge opening being located distant from each other on said first processing means;
   second processing means substantially concentric to said first processing means and having an outer surface;
   at least one of said first and second processing means being connected to a respective one of said at least one drive means, at least one of said first and second processing means including shearing tool means which protrude radially toward the other of said processing means, said first and said second processing means being supported in a rotatable manner relative to each other about an axis of rotation, a processing gap being formed therebetween; and
   journal means for enabling rotation of one of said first and said second processing means relative to the other of said first and said second processing means;
   wherein at least part of said tool means of one of said processing means comprise shearing surfaces facing an opposing surface of the other of said processing means, and forming an angle with said opposing surface so as to diverge in forward direction as seen in the direction of rotation.

2. An apparatus for processing-dispersions of solids in a fatty phase, comprising:
   at least one drive means for imparting rotational movement;
   first processing means being formed as a processing container including at least one supply opening and at least one discharge opening, the processing container being of conical shape having an outer conical surface, an inner conical surface, and a smaller front plane of its conical shape located on a side of said supply opening, said supply opening and said discharge opening being located distant from each other on said first processing means;
   second processing means substantially concentric to said first processing means and having an outer surface;
   at least one of said first and second processing means being connected to a respective one of said at least one drive means, at least one of said first and second processing means including shearing tool means which protrude radially toward the other of said processing means, said first and said second processing means being supported in a rotatable manner relative to each other about an axis of rotation, a processing gap being formed therebetween; and
   journal means for enabling rotation of one of said first and said second processing means relative to the other of said first and said second processing means;
   wherein said tool means of one of said processing means comprise shearing tools having shearing surfaces which face an opposing surface of the other of said processing means, and form an angle with said opposing surface so as to diverge in forward direction as seen in the direction of rotation; and
   scratching tools having a scratching edge situated radially outwards to scratch said dispersion from the opposing outer surface.

3. Apparatus as claimed in claim 2, wherein said shearing tools and said scratching tools are at least on said second processing means.

4. Apparatus as claimed in claim 2, wherein the number of said scratching tools is smaller than that of said shearing tools.

5. An apparatus for processing dispersion of solids in a fatty phase, comprising:
   at least one drive means for imparting rotational movement;
   first processing means being formed as a processing container including at least one supply opening and at least one discharge opening to enable the dispersion to flow from said supply opening to said discharge opening, said supply opening and said discharge opening being located distant from each other on said first processing means;
   second processing means substantially concentric to said first processing means;
   at least one of said first and second processing means being connected to a respective one of said at least one drive means, at least one of said first and second processing means including first tool means which protrude radially toward the other of said processing means, said first and said second processing means being supported in a rotatable manner relative to each other about an axis of rotation, there being a processing gap therebetween, to serve as a first treatment space;
   Journal means for enabling rotation of one of said first and said second processing means relative to the other of said first and said second processing means;

wall means defining a second treatment space which communicates with at least one of said openings; and third processing means comprising a shaft and second tool means radially protruding from said shaft to cooperate with said wall means, said second tool means extending at least over part of said wall means;

wherein at least part of said second tool means comprises shearing surfaces facing said wall means and forming an angle with said wall means so as to diverge in forward direction as seen in a direction of said rotation.

6. Apparatus as claimed in claim 5, wherein at least a part of said second tool means comprises a scratching edge disposed radially outwardly to form a scratching tool for scratching said dispersion from said wall means.

7. Apparatus as claimed in claim 5, wherein said second treatment space is after said first treatment space as seen in the direction of a flow of said dispersion.

8. An apparatus for processing dispersions of solids in a fatty phase, comprising:

at least one drive means for imparting rotational movement;

first processing means being formed as a processing container having a first surface which defines a treatment space, said first processing means including at least one supply opening and at least one discharge opening, said supply opening and said discharge opening being located distant from each other on said first processing means;

second processing means substantially concentric to said first processing means and having a second, radially outer surface;

at least one of said first and said second processing means being connected to a respective one of said at least one drive means, at least one of said first and said second processing means including a tool arrangement which comprises first tool means having shearing surfaces which face one of said first and said second surfaces and form an angle with the opposing surface so as to diverge in forward direction when seen in the direction of said rotation; and at least one of said first and second processing means having second tool means comprising a scratching edge directed radially outwards of one of said processing means to form a scratching tool for scratching said dispersion from an opposing surface of the other of said processing means, upon rotation in said direction of rotation;

said first and second tool means protrude radially from respective ones of said first and said second surfaces, said first and second processing means being supported in a rotatable manner relative to each other about an axis of rotation, there being a processing gap therebetween; and journal means for enabling rotation of one of said first and said second processing means relative to the other of said first and said second processing means.

9. Apparatus as claimed in claim 8, wherein said tool arrangement forms at least two tool crowns arranged in axially spaced relationship, each of said tool crowns comprising at least one scratching tool.

10. Apparatus as claimed in claim 8, wherein said tool arrangement comprises an alternation of said first and second tool means.

11. Apparatus as claimed in claim 8, wherein said first and second tool means are arranged diametrically opposite to each other.

12. Apparatus as claimed in claim 8, wherein said scratching edge is closer to the opposing surface than any portion of said shearing surfaces.

* * * * *